Nov. 10, 1931.   F. L. BROUSSOUSE ET AL   1,831,737
SERVO MOTOR FOR BRAKING VEHICLES
Filed June 11, 1927
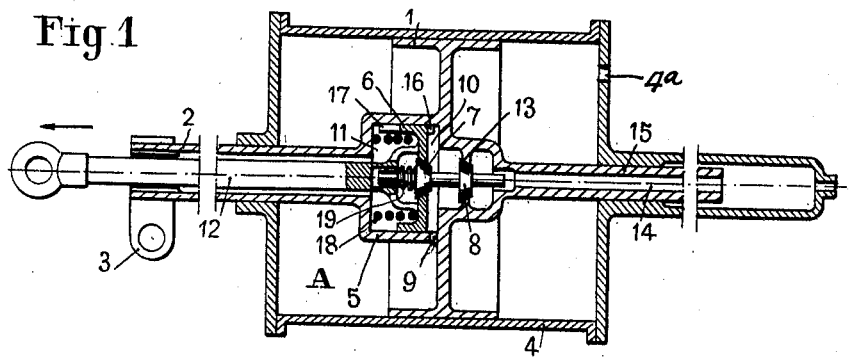
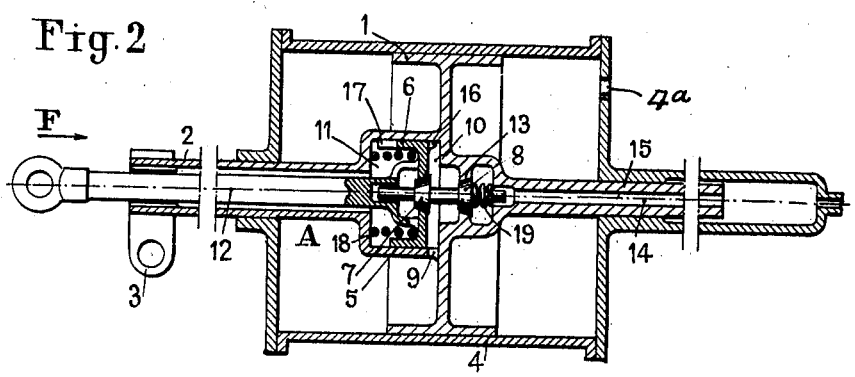
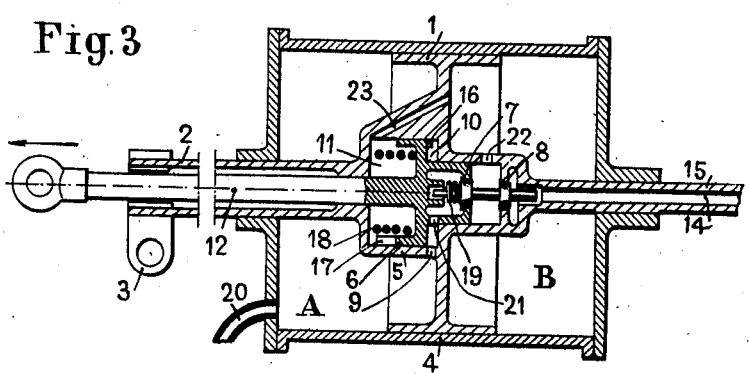
INVENTOR
FERNAND L. BROUSSOUSE
PAUL J. LEBOUCHER
BY
ATTORNEY Patented Nov. 10, 1931

1,831,737

UNITED STATES PATENT OFFICE

FERNAND LOUIS BROUSSOUSE, OF GARAT, AND PAUL JULES LEBOUCHER, OF PARIS, FRANCE

SERVO-MOTOR FOR BRAKING VEHICLES

Application filed June 11, 1927, Serial No. 198,289, and in France June 21, 1926.

This invention relates to servo-motors for transmitting motion and which may be used for instance in reversing gears for steam engines, in steering engines for boats, in laying out ordnance and more particularly in braking devices for vehicles, hoisting apparatus or the like.

It is more particularly characterized by the combination with a piston reciprocating in a cylinder of a convenient distributing device which is constituted preferably by the usual direct brake cock, said cock being located in the piston itself with a convenient clearance with a view to realize the union or connection of the secondary control with the primary control, the clearance provided in the said piston allowing the necessary movement of the parts for the distribution of the motive fluid.

In the accompanying drawings which show by way of example diagrammatic views of a controlling device according to the invention:

Figs. 1, 2 and 3 are diagrammatical sectional views respectively of a servo-motor device according to the invention which is to be applied to the braking control of a motorcar, such device being shown in Fig. 1 for a vacuum control in Fig. 2 for a pressure control and Fig. 3 for a vacuum control.

In the form of device in Fig. 1 the main piston 1 which in the constructional form shown is devised for controlling the brakes of a motor car through a rod 2 and a strut 3, and is located within a cylinder 4 which is closed at both its ends with the exception of a vent 4ᵃ formed in one end as clearly shown in Figs. 1 and 2. We also provide within said piston 1 a chamber 5 concentric with the cylindrical casing 4 and conveniently machined for receiving a brake valve comprising as shown in Fig. 1 a regulating or balancing piston 6 with a double poppet valve 7—8 the movement of which is controlled by said piston 6.

The chamber 5 is divided by the piston 6 into two chambers 10—11 one of which 10 communicates with the part A of chamber 5 through channel 9. The second chamber 11 communicates with the atmosphere through the hollow rod 2 extending from piston 1 and is provided with valve members 7. Located inside such hollow rod is the rod 12 extending from the piston 6 which is to be operably connected with a controlling apparatus such as pedal or other device not shown in the drawings.

The member 8 of the double poppet valve is forced against a seat 13 thus closing the communication between the chamber 10 and a passage 14 provided in the guiding rod 15 of the piston 1 and communicating in any convenient way with the suction side of the motor of the car to be braked or any other source of vacuum.

Abutments 16—17 are provided for limiting the movement of piston 16 in the chamber 5.

The operation is as follows:

In the position of rest, the parts occupy the position shown in Figure 1, the valve member 8 being forced upon its seat by the combined action of springs 18—19. When the valve member 7 is moved from its seat, such movement establishes communication of the chamber A of the main casing 4 as well as the chamber 10 with the atmosphere.

When the usual brake pedal (not shown in the drawings) is actuated, such pedal being connected with the rod 12, such actuation causes the rod 12 to be moved in the direction of the arrow in Figure 1, the piston 6 carries the double poppet valve 7—8 and consequently opens the orifice 13, bringing the chambers 10 and A into communication with the vacuum while the valve member 7 is closed by its spring. The vacuum then acts to move the piston 1 and its rod 2 in the direction of the arrow and the piston 6 in a direction opposite to such arrow.

When the brake pedal is released, the piston 6 is moved by the action of the vacuum in a direction opposite to the arrow, such action being assisted by the spring 18 and said piston forces the valve member 8 upon its seat, thus cutting off communication of the chambers 10 and A with the suction of the motor of the car (not shown in the drawings), while on the other hand the member 7 is moved from its seat and brings chambers 10 and A into communication with the atmosphere through the hollow rod 2. The several parts are brought back to their position of rest by means of return springs used in the braking parts as well as by the springs usually employed in brake-operating rods.

In the form shown in Figure 2, which controls the operation of the servo-brake by means of a fluid under pressure, the direction of the seats of the poppet valves 7—8 has been reversed, the operation of the rod 12 being effected in the direction of the arrow F in Figure 2; that is to say, by pushing the same.

When the rod 12 is acted upon in the direction of the arrow in Figure 2, the valve member 8 is brought to its opened position and allows the fluid under pressure to enter the chambers 10 and A which fluid then acts in reverse direction upon pistons 1 and 6. At rest, and when the rod 12 is no longer acted upon the valve member 7 is moved from its seat and brings chambers A and 11 into communication with the atmosphere.

In the constructional form of Figure 3, the chamber A communicates, for instance, by means of the pipe 20, with the suction of the motor, and the vacuum is established through the valve member 7 in open position and ports 9, 21, and 22 on both sides of the main piston 1. When the rod 12 is moved in the direction of the arrow in Figure 3, the said member 7 opens and brings into communication with the atmosphere the chamber B of the cylinder 4, which is in communication with the chamber 11 of the chamber 5 through the port 23, while the vacuum which acts for moving the piston 1 towards the left hand side, acts for moving the internal piston 6 towards the right hand side, by acting upon the annular space defined between the wall of the chamber 5 and the casing of the valve member 7.

In the several forms of the invention, abutments are arranged on the internal piston 6 in order to allow the said piston 6 to carry the main piston 1 and the braking parts by manipulation of the controlling pedal in the event that the servo-motor should fail. In the form illustrated in Fig. 3, the arrangement of the port 21 of the secondary piston and ports 9 and 22 of the primary piston, insures a balance of the pistons and valves relatively to the actuating pressure while securing the best conditions of tightness and lubrication. The invention applies in all cases where it is desired to provide for control of any part of an apparatus, and especially for controlling the braking of motor vehicles.

The piston 6 in addition to establishing a connection for operating the valve members 7—8, also provides means for indicating to an operator whether the brake mechanism is functioning properly. This action will be readily understood, when it is remembered that in the operation of the brake pedal to actuate the rod 12, the piston 6 must be moved against the action of the vacuum in chamber 10 and passage 14. Thus the operator will "feel" the pull of the vacuum upon the piston, associated rod 12, and foot pedal, and will know that the braking action will be proper. If for any reason, the operator fails to "feel" the pull upon the piston 6, he will be appraised of the fact that the servo-brake is inoperative, and that the braking action must be effected by engagement of the abutment 17 with the forward wall of the chamber 5 to effect movement of the piston 1 and associated rod 2.

What we claim is:

1. In a power actuator, a cylinder, means upon one end of said cylinder for connection to a source of suction, an atmospheric inlet upon the other end of said cylinder, a piston slidable in said cylinder and including a hollow actuating rod, said rod being enlarged to provide a compartment upon one side of said piston, a second compartment formed upon the opposite side of said piston and in communication with said first compartment and in communication with said source of suction, a valve seat in said last named compartment, a control piston slidable within said last-named compartment, a valve seat in said piston and a double poppet valve associated between said valve seats for controlling the suction by manipulation of said valves through said first-named piston.

2. In a brake actuator, a cylinder, a piston reciprocable therein, said piston having an enlarged compartment on one side thereof, and terminating in a hollow actuator rod extending exteriorly of said cylinder, a valved control piston slidable in said compartment and having a manually operable rod extended through said hollow actuator rod, means upon one end of said cylinder for connection to a source of suction, an atmospheric inlet upon the other end of said cylinder, a second compartment on said first-named piston including a valve seat, said second-hand compartment being in communication with said source of suction, said first-named piston having a spring-pressed double poppet valve disposed between said second-named piston and said second-named compartment, passageways communicating between said first-named compartment and one side of said cylinder, whereby upon operation of said second-named piston in alternate directions, said valves will be caused to alternately open and close to control the action of said suction means upon said first-named piston.

In testimony whereof we hereunto set our hands.

FERNAND LOUIS BROUSSOUSE.
PAUL JULES LEBOUCHER.